United States Patent
Saito et al.

(10) Patent No.: US 8,688,299 B2
(45) Date of Patent: Apr. 1, 2014

(54) MODE CHANGE CONTROL SYSTEM FOR HYBRID VEHICLE

(75) Inventors: Katsuyuki Saito, Hadano (JP); Munetoshi Ueno, Atsugi (JP); Hidetoshi Tsukidate, Kawasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1408 days.

(21) Appl. No.: 12/062,006

(22) Filed: Apr. 3, 2008

(65) Prior Publication Data

US 2008/0275601 A1 Nov. 6, 2008

(30) Foreign Application Priority Data

May 2, 2007 (JP) ................................. 2007-121827
Mar. 4, 2008 (JP) ................................. 2008-054052

(51) Int. Cl.
*B60W 20/00* (2006.01)

(52) U.S. Cl.
USPC .................. 701/22; 701/36; 701/53; 701/82; 180/65.21; 180/65.265; 180/65.29

(58) Field of Classification Search
None
See application file for complete search history.

(56) References Cited

U.S. PATENT DOCUMENTS

| | | | |
|---|---|---|---|
| 5,713,814 A * | 2/1998 | Hara et al. | 477/5 |
| 5,735,770 A * | 4/1998 | Omote et al. | 477/5 |
| 5,801,499 A * | 9/1998 | Tsuzuki et al. | 318/141 |
| 5,846,155 A | 12/1998 | Taniguchi et al. | |
| 5,982,045 A * | 11/1999 | Tabata et al. | 290/17 |
| 6,018,198 A * | 1/2000 | Tsuzuki et al. | 290/17 |
| 6,019,699 A * | 2/2000 | Hoshiya et al. | 477/20 |
| 6,054,776 A * | 4/2000 | Sumi | 290/17 |
| 6,302,227 B1 | 10/2001 | Takemura et al. | |
| 6,352,489 B1 * | 3/2002 | Kuroda et al. | 477/5 |
| 6,494,801 B1 * | 12/2002 | Ohtake et al. | 475/5 |
| 7,607,499 B2 * | 10/2009 | Egami | 180/65.265 |
| 7,677,340 B2 * | 3/2010 | Ichijo et al. | 180/65.235 |
| 2003/0045988 A1 * | 3/2003 | Suzuki et al. | 701/54 |
| 2004/0040760 A1 * | 3/2004 | Kadota | 180/65.2 |
| 2004/0097316 A1 * | 5/2004 | Misu | 475/5 |
| 2004/0235613 A1 * | 11/2004 | Aoki et al. | 477/3 |
| 2004/0259684 A1 * | 12/2004 | Kresse et al. | 477/115 |
| 2005/0090370 A1 | 4/2005 | Berger et al. | |
| 2005/0256623 A1 * | 11/2005 | Hubbard et al. | 701/54 |
| 2006/0017414 A1 * | 1/2006 | Joe et al. | 318/432 |
| 2006/0175997 A1 * | 8/2006 | Hommi et al. | 318/432 |
| 2007/0056783 A1 * | 3/2007 | Joe et al. | 180/65.2 |
| 2007/0080005 A1 * | 4/2007 | Joe | 180/65.2 |
| 2007/0102205 A1 * | 5/2007 | Yamanaka et al. | 180/65.1 |
| 2007/0102207 A1 * | 5/2007 | Yamanaka et al. | 180/65.3 |

(Continued)

FOREIGN PATENT DOCUMENTS

DE 196 29 235 A1 1/1997
DE 198 38 853 A1 3/1999

(Continued)

*Primary Examiner* — Jonathan M Dager
(74) *Attorney, Agent, or Firm* — Young Basile

(57) ABSTRACT

In a hybrid vehicle in which a mode change between an electric drive mode and a hybrid drive mode is carried out based on information concerning an operating condition and a driving status, an impairment of operability due to a change of the drive mode at a reverse travel of the vehicle is prevented. Upon a start of the reverse travel, the drive mode before the start of the reverse travel is continued at the start of the reverse travel.

13 Claims, 7 Drawing Sheets

(56) References Cited

U.S. PATENT DOCUMENTS

| | | | |
|---|---|---|---|
| 2007/0102208 A1* | 5/2007 | Okuda et al. | 180/65.3 |
| 2007/0221421 A1* | 9/2007 | Tanishima | 180/65.2 |
| 2007/0227790 A1* | 10/2007 | Tanishima | 180/65.2 |
| 2007/0259755 A1* | 11/2007 | Tanishima | 477/3 |
| 2007/0278022 A1* | 12/2007 | Tanishima | 180/65.2 |
| 2008/0006457 A1* | 1/2008 | Fujimoto et al. | 180/65.1 |
| 2008/0017427 A1* | 1/2008 | Nakanowatari | 180/65.2 |
| 2008/0045365 A1* | 2/2008 | Usoro | 475/5 |
| 2008/0058154 A1* | 3/2008 | Ashizawa et al. | 477/5 |
| 2008/0153661 A1* | 6/2008 | Shibata et al. | 477/3 |
| 2008/0221763 A1* | 9/2008 | Cawthorne et al. | 701/62 |
| 2008/0228363 A1* | 9/2008 | Kouno et al. | 701/54 |
| 2011/0009235 A1* | 1/2011 | Song et al. | 477/3 |

FOREIGN PATENT DOCUMENTS

| | | |
|---|---|---|
| DE | 100 02 133 A1 | 8/2000 |
| DE | 103 16 422 A1 | 12/2003 |
| DE | 103 11 270 A1 | 9/2004 |
| EP | 1 090 794 A2 | 4/2001 |
| JP | 11-082260 | 3/1999 |
| JP | 11-257116 | 9/1999 |
| JP | 11-313407 | 11/1999 |
| JP | 2001-140673 | 5/2001 |
| JP | 2005-001563 | 1/2005 |
| JP | 2007-099141 | 4/2007 |

* cited by examiner

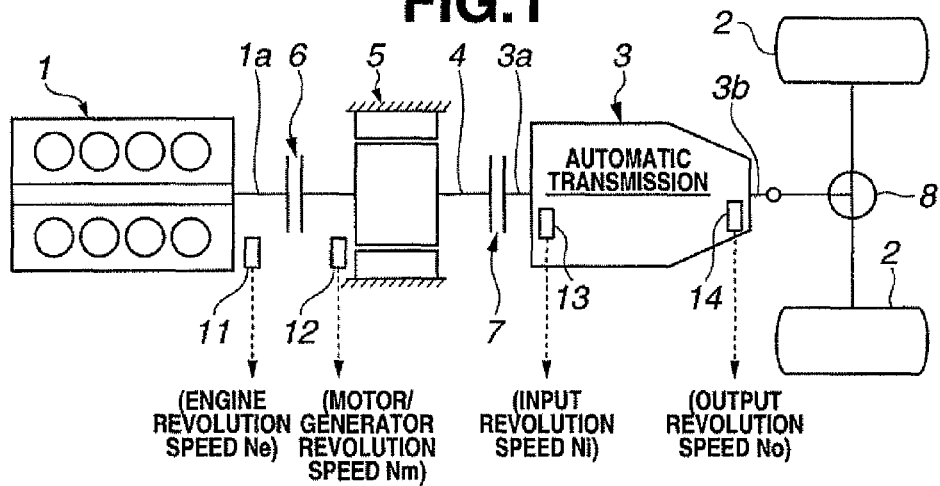
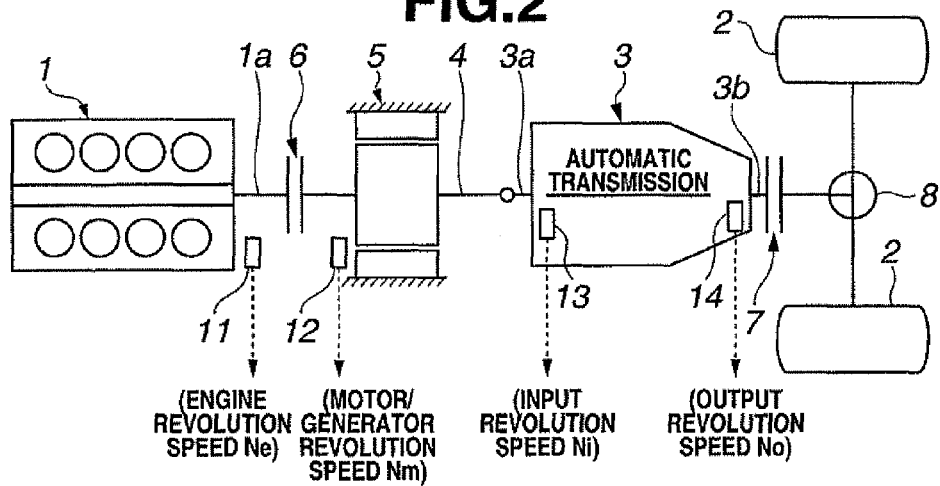
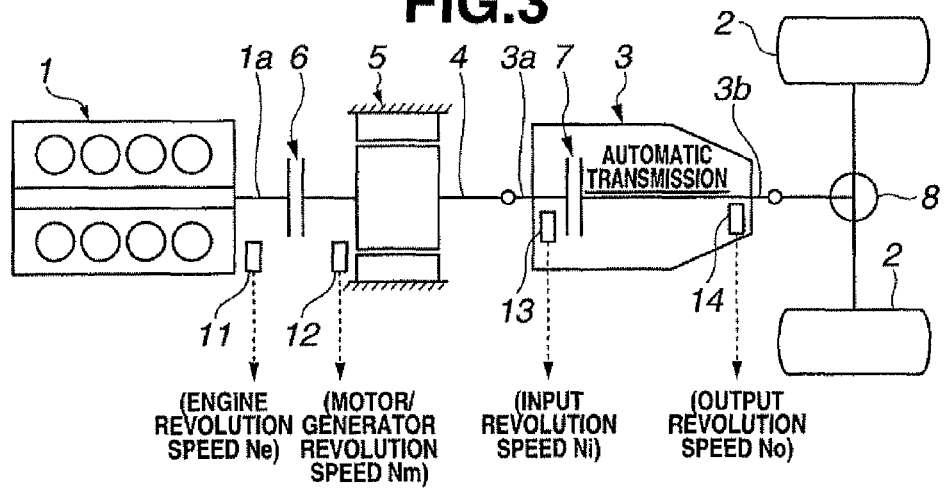

MODE CHANGE CONTROL SYSTEM FOR HYBRID VEHICLE

CROSS-REFERENCE TO RELATED APPLICATIONS

This application claims priority from Japanese Patent Application Serial No. 2007-121827, filed May 2, 2007, and No. 2008-054052, filed Mar. 4, 2008, each of which is incorporated herein in its entirety by reference.

TECHNICAL FIELD

The present invention relates to a mode change control system for a hybrid vehicle that is capable of changing between an electric drive (EV) mode and a hybrid drive (HEV) mode.

BACKGROUND

In recent years, there have been proposed and developed various hybrid drive apparatus and systems used for the hybrid vehicle as mentioned above. One such hybrid drive apparatus or system has been disclosed in Japanese Patent Provisional Publication No. 11-082260 (hereinafter is referred to as "JP11-082260"). In this hybrid drive system, an engine rotation is connected to a shaft that leads to a transmission, and the motor/generator is installed between the engine and the transmission. Further, between the engine and the motor/generator, a first clutch capable of engaging and disengaging the engine and the motor/generator is provided. Also, between the motor/generator and the transmission, a second clutch capable of engaging and disengaging the motor/generator and an input shaft of the transmission is employed instead of a torque converter.

In the hybrid vehicle having the above hybrid drive system, in a case where the first clutch is released and the second clutch is engaged, the mode becomes the electric drive (EV) mode in which the vehicle travels by only the power of the motor/generator. On the other hand, in a case where both of the first and second clutches are engaged, the mode becomes the hybrid drive (HEV) mode in which the vehicle travels by both power of the engine and the motor/generator.

In the hybrid vehicle having the electric drive (EV) mode and the hybrid drive (HEV) mode as described, an electric drive (EV) mode area and a hybrid drive (HEV) mode area are split according to a combination of a depression amount of an accelerator pedal by a driver (an accelerator opening APO) and a vehicle speed VSP of the hybrid vehicle. More specifically, an area in which the accelerator pedal depression amount is smaller than a predetermined value and also the vehicle speed is smaller than a predetermined value is the electric drive (EV) mode area, and an area other than this area is the hybrid drive (HEV) mode area. Based on a map corresponding to these areas, as a normal manner of the mode change control, a judgment is made as to whether an operating condition is in the electric drive (EV) mode area or the hybrid drive (HEV) mode area from the accelerator opening APO and the vehicle speed VSP on the map, then the mode change control between both the areas is carried out.

BRIEF SUMMARY

Embodiments of a mode change control system for a hybrid vehicle are taught herein. One such device includes, for example, an engine, and a controller configured to select and change between an electric drive mode in which the vehicle is driven by only power of the motor/generator with the engine stopped, and a hybrid drive mode in which the vehicle is driven by power of at least the engine or both the engine the motor/generator based on information of a operating condition in a driving status of the vehicle. The controller is further configured to judge the drive mode so that a drive mode before a start of a reverse travel continues at the start of the reverse travel.

Methods for changing the control system mode of hybrid vehicle are taught herein. One method includes, for example, selecting and changing between an electric drive mode in which the vehicle is driven by only the power of motor/generator with the engine stopped and a hybrid drive mode in which the vehicle is driven by power of at least the engine, or both the engine and the motor/generator based on information of an operation condition and a driving status of the vehicle. The method further includes judging the drive mode so that a drive mode before a start of a reversal travel continues at the start of the reverse travel.

BRIEF DESCRIPTION OF THE DRAWINGS

The description herein makes reference to the accompanying drawings wherein like reference numerals refer to like parts throughout the several views, and wherein:

FIG. 1 is a schematic view of a power train of a hybrid vehicle that can use a mode change control system according to embodiments of the invention;

FIG. 2 is a schematic view of a power train of another hybrid vehicle that can use a mode change control system according to embodiments of the invention;

FIG. 3 is a schematic view of a power train of yet another hybrid vehicle that can use a mode change control system according to embodiments of the invention;

DETAILED DESCRIPTION OF EMBODIMENTS OF THE INVENTION

Figure 4:
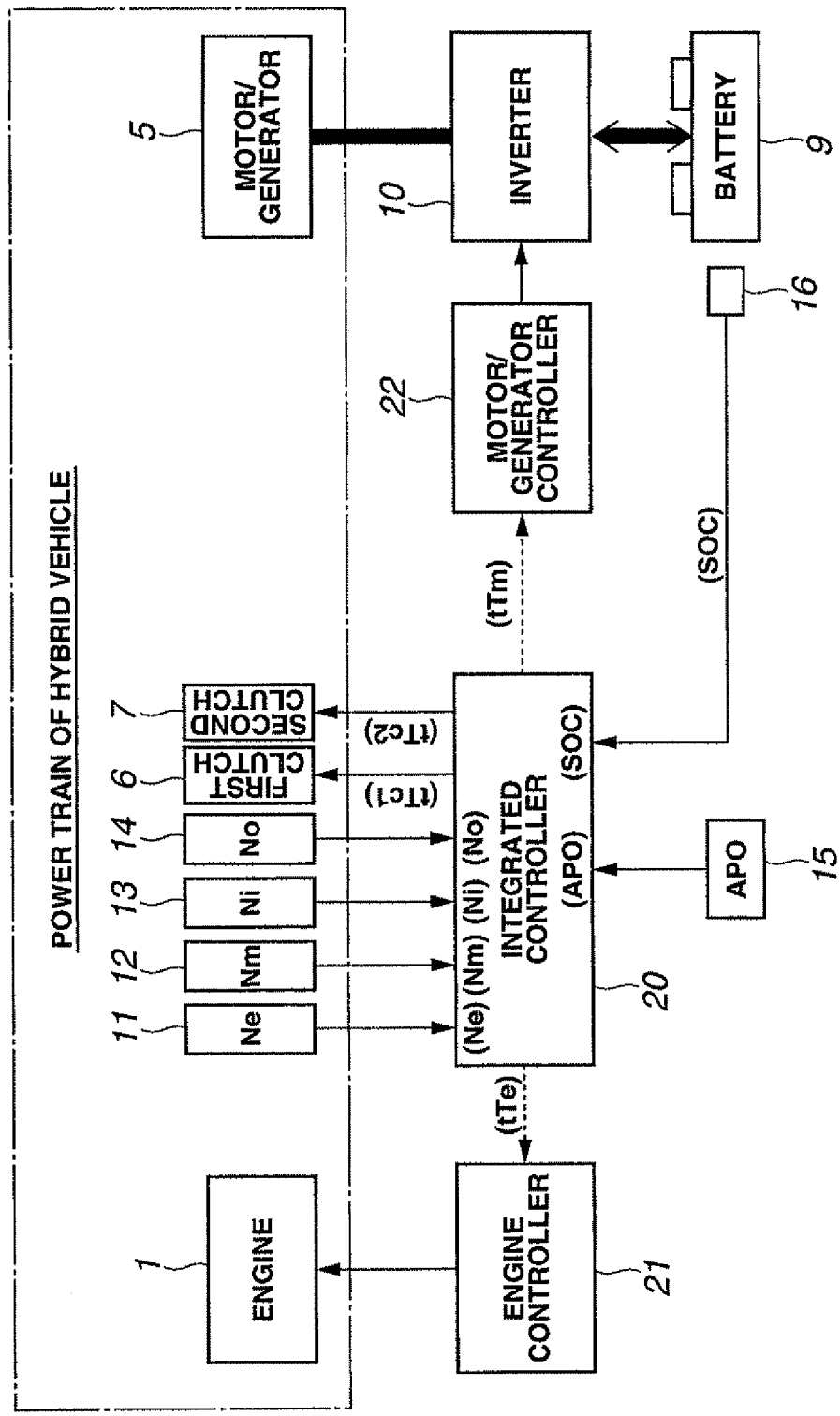
FIG. 4 is a block diagram showing a control system of the power train shown in FIGS. 1 to 3.

In the above control system described in JP11-082260, the judgment as to which mode is made based on information concerning the operating condition and a driving condition or status, in general, based on the information about the accelerator opening APO and the vehicle speed VSP. As for the judgment of the selection of the drive mode, it is done based on the same conditions in both forward and reverse travel.

Accordingly, in the conventional control system of the hybrid vehicle the engine can be started at the reverse travel since the drive mode is selected by the same conditions based on the information about the operating condition and driving status at both the forward and reverse travels. In this case, since a shock of the engine start can be large, this might affect the driver's operation during the reverse travel, particularly when a relatively short distance is involved. Further, there can arise a case where the engine that has been operating will be stopped at the reverse travel. In this case, an awkward or unpleasant feeling to the driver can result.

In contrast, embodiments of a control system taught herein and described with reference to the drawing figures execute the engine start and engine stop as little as possible and minimize awkward feelings to the driver without affecting driver operation.

FIG. 1 shows a power train of a front engine 1 and rear-wheel drive hybrid vehicle that can use a control system according to embodiments of the invention. An automatic transmission 3 is placed back from the engine 1 in front and rear direction of the vehicle in tandem same as a normal rear wheel drive vehicle. A motor/generator 5 is connected with a shaft 4 that transmits a rotation from the engine 1 (an engine crankshaft 1a) to an input shaft 3a of the automatic transmission 3.

The motor/generator 5 acts as a motor or as a generator and is placed between the engine 1 and the automatic transmission 3. Between this motor/generator 5 and the engine 1, and further between the shaft 4 and the engine crankshaft 1a, a first clutch 6 is inserted or disposed. This first clutch 6 connects the engine 1 and the motor/generator 5 such that the engine 1 and the motor/generator 5 can separate. Here, the first clutch 6 is a clutch that can continuously vary a transmission torque capacity. For example, the first clutch 6 is formed by frictional elements such as a wet multiple disc clutch capable of varying the transmission torque capacity by continuously controlling a quantity of a clutch fluid flow and/or a clutch fluid pressure with a proportional solenoid.

Between the motor/generator 5 and the automatic transmission 3, and further between the shaft 4 and the transmission input shaft 3a, a second clutch 7 is inserted or disposed. This second clutch 7 connects the motor/generator 5 and the automatic transmission 3 such that the motor/generator 5 and the automatic transmission 3 can separate.

The second clutch 7 is also a clutch that can continuously vary the transmission torque capacity, same as the first clutch 6. For example, the second clutch 7 is formed by frictional elements such as a wet multiple disc clutch capable of varying the transmission torque capacity by continuously controlling a quantity of a clutch fluid flow and/or a clutch fluid pressure with a proportional solenoid.

The automatic transmission 3 selectively engages or releases a plurality of frictional elements (clutch and brake etc.) and determines a drive line (a speed stage) by a combination of these engagement release maneuvers. Thus, the automatic transmission 3 changes the rotation from the transmission input shaft 3a with a transmission ratio according to a selected speed stage and outputs the rotation to an output shaft 3b. This output rotation is separately transmitted to the left and right rear driving wheels 2 through a differential gear device 8 for the drive of the vehicle. However, needless to say, the automatic transmission 3 is not limited to a multi-stage transmission; it can be a continuously variable transmission that can continuously vary the transmission ratio from a current ratio (speed stage) to a target ratio (speed stage).

In the power train of the hybrid vehicle shown in FIG. 1, in a case where an electric drive (EV) mode used in a low load and low vehicle speed condition is required, including a start of the vehicle from a stop state, the first clutch 6 is released and the second clutch 7 is engaged. As a result, the automatic transmission 3 is in a power transmission state.

When driving the motor/generator 5 in this condition, only the output rotation from the motor/generator 5 is transmitted to the transmission input shaft 3a. The automatic transmission 3 changes the rotation of the input shaft 3a according to the selected speed stage and outputs it through the transmission output shaft 3b. Afterwards, the rotation from the transmission output shaft 3b is transmitted to the left and right rear wheels 2 through the differential gear device 8, and it becomes possible to drive the vehicle by way of the EV drive by only the motor/generator 5.

In a case where a HEV mode used in a high speed drive condition, or a large load drive condition, is required, both of the first clutch 6 and the second clutch 7 are engaged. The automatic transmission 3 is in the power transmission state. In this condition, the output rotation from the engine 1, or both output rotations from the engine 1 and from the motor/generator 5, is transmitted to the transmission input shaft 3a. The automatic transmission 3 changes the rotation of the input shaft 3a according to the selected speed stage and outputs it through the transmission output shaft 3b. Afterwards, the rotation from the transmission output shaft 3b is transmitted to the left and right rear wheels 2 through the differential gear device 8, and it becomes possible to drive the vehicle by way of the HEV drive by the power from both of the engine 1 and the motor/generator 5.

In a case where the engine 1 is started in the EV mode in which the engine 1 is stopped and the first clutch 6 is released and the second clutch 7 is engaged and the vehicle travels by only power from the motor/generator 5, the first clutch 6 is engaged and an engine-cranking is carried out by using the motor/generator 5 as a engine-starter. After the engine start, the mode changes or is switched from the EV mode to the HEV mode in which the vehicle travels by the power from both the engine 1 and the motor/generator 5.

During the HEV mode, in a case where there is a surplus of an energy when the engine 1 is driven under an optimum fuel efficiency condition, the motor/generator 5 works as the generator using this surplus energy. The surplus energy is transformed into electric power. Then, by storing this generated electric power to use for the motor drive of the motor/generator 5, the fuel economy of the engine 1 can be improved.

In FIG. 1 the second clutch 7, which connects the motor/generator 5 and the driving wheels 2 to be able to separate them, is inserted between the motor/generator 5 and the automatic transmission 3. However, as shown in FIG. 2, the second clutch 7 can be inserted between the automatic transmission 3 and the differential gear device 8. In this case as well, the same function and advantages are gained.

Further, in FIGS. 1 and 2, the clutch is especially provided as the second clutch 7 at an input side or an output side of the automatic transmission 3. Instead, as shown in FIG. 3, a frictional element for selecting a shift of the forward travel or a frictional element for selecting a shift of the reverse travel that is employed in the automatic transmission 3 can be used as the second clutch 7. In this case, the second clutch 7 functions as the mode selection, same as the cases of FIGS. 1 and 2. In addition to this, since the automatic transmission 3 is in the power transmission state when engaged for the mode selection, the second clutch provided for clutch use is not needed. This has a cost advantage due to the lack of need for a dedicated second clutch.

The engine 1, the motor/generator 5, the first clutch 6 and the second clutch 7, which form the power train of the hybrid vehicle shown in FIGS. 1 to 3, are controlled by a system illustrated in FIG. 4.

The control system in FIG. 4 has an integrated controller 20 that comprehensively controls an operating or working point (torque and revolution speed) of the power train. The operating point of the power train is determined according to a target engine torque tTe, a target motor/generator torque tTm, a target transmission torque capacity tTc1 of the first clutch 6 and a target transmission torque capacity tTc2 of the second clutch 7.

In order to determine the operating point of the power train, the integrated controller 20 inputs a signal from an engine rpm sensor 11 that detects an engine revolution speed Ne, a signal from a motor/generator rpm sensor 12 that detects a motor/generator revolution speed Nm, a signal from an input rpm sensor 13 that detects a transmission input revolution speed Ni, a signal from an output rpm sensor 14 that detects a transmission output revolution speed No, a signal from an accelerator opening sensor 15 that detects an accelerator pedal depression amount (accelerator opening APO) indicating a required load state of the engine 1, and a signal from a charge state sensor 16 that detects a state of charge (SOC) (that is, usable electric power or charge rate or ratio) of a battery 9 storing electric power for the motor/generator 5.

The engine rpm sensor 11, the motor/generator rpm sensor 12, the input rpm sensor 13 and the output rpm sensor 14 can be respectively arranged as shown in FIGS. 1 to 3.

The integrated controller 20 selects the drive mode (EV mode or HEV mode) capable of achieving a driver's desired vehicle driving force based on the accelerator opening APO, the battery charge state SOC and the transmission output revolution speed No (vehicle speed VSP). Further, the integrated controller 20 respectively calculates or computes the target engine torque tTe, the target motor/generator torque tTm, the target first clutch transmission torque capacity tTc1 and the target second clutch transmission torque capacity tTc2, and then performs driving force control.

The target engine torque tTe computed by the integrated controller 20 is provided or sent to an engine controller 21, and the target motor/generator torque tTm computed by the integrated controller 20 is sent to a motor/generator controller 22. The engine controller 21 controls the engine 1 so that an engine torque Te becomes the target engine torque tTe. The motor/generator controller 22 controls the motor/generator 5 so that a torque Tm (or the motor/generator revolution speed Nm) of the motor/generator 5 becomes the target motor/generator torque tTm through the battery 9 and an inverter 10.

Each of the controllers, such as integrated controller 20, etc., is here implemented by, for example, a respective microcomputer including a random access memory (RAM), a read-only memory (ROM) and a central processing unit (CPU) in addition to various input and output connections. Generally, the control functions described herein and associated with each controller are performed by execution by the CPU of one or more software programs stored in ROM. Of course, some or all of the sections and their associated functions can be implemented by hardware components. While three controllers are described, more or fewer are also possible.

The integrated controller 20 provides engaging control solenoids (not shown) of the first and second clutches 6 and 7 with solenoid currents respectively corresponding to the target first clutch transmission torque capacity tTc1 and the target second clutch transmission torque capacity tTc2. The integrated controller 20 then respectively controls the first and second clutches 6 and 7 so that a transmission torque capacity Tc1 of the first clutch 6 becomes the target first clutch transmission torque capacity tTc1, and a transmission torque capacity Tc2 of the second clutch 7 becomes the target second clutch transmission torque capacity tTc2.

Figure 5:
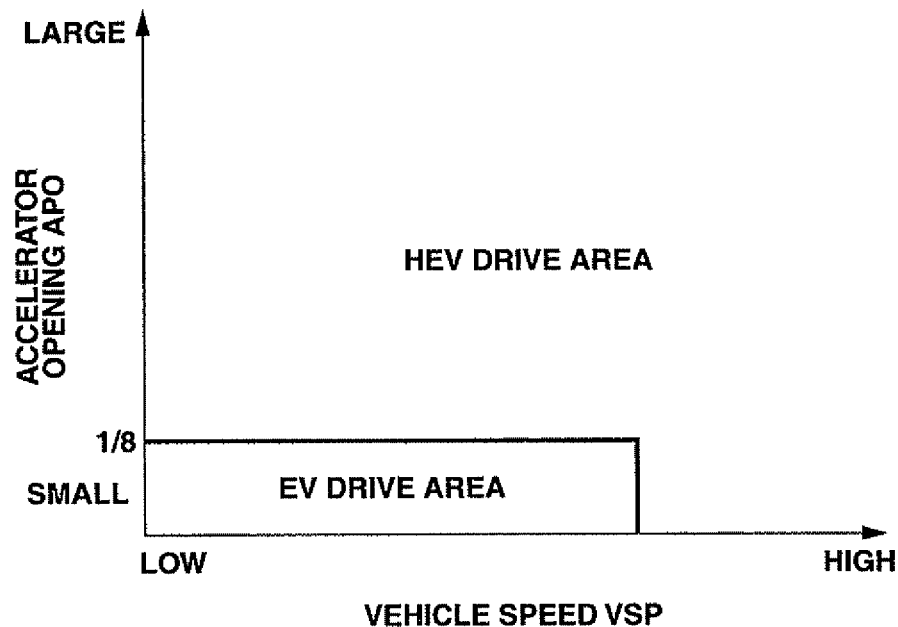
FIG. 5 is an area map showing an EV drive area and a HEV drive area used for selecting a drive mode at a forward travel.

Here, the mode change control between the EV mode and the HEV mode, which is executed by the integrated controller 20, is explained with reference to a map in FIG. 5. In FIG. 5, a HEV drive area is shown where the accelerator opening APO is greater than or equal to a predetermined value or the vehicle speed VSP is greater than or equal to a predetermined value. An EV drive area is also shown where the accelerator opening APO is smaller than the predetermined value and also the vehicle speed VSP is smaller than the predetermined value. The HEV drive area and the EV drive area are separated with a demarcation or dividing line. The integrated controller 20 prestores mapping data such as that exemplified in FIG. 5 and judges whether the accelerator opening APO and the transmission output revolution speed No (vehicle speed VSP) of the input information are in the EV drive area or the HEV drive area at certain intervals. When a last previous judgment and a current judgment are the same, the current drive mode is maintained. When the last previous judgment and the current judgment are different, the control for changing the drive mode is carried out. Here, in order to prevent hunting the dividing line used at the mode change from the HEV mode to the EV mode and the dividing line used at the mode change from the EV mode to the HEV mode can be different.

Figure 6:
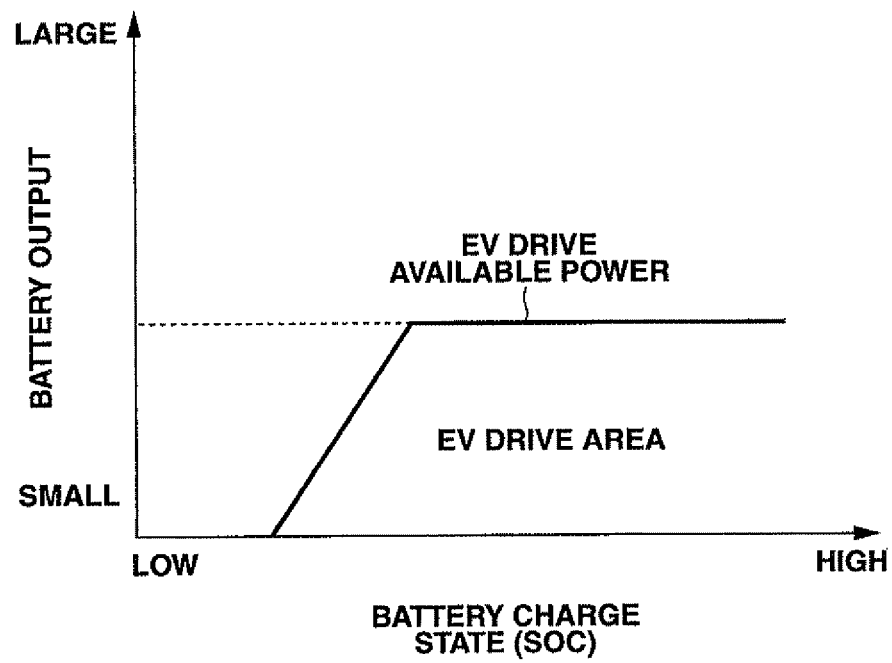
FIG. 6 is an area map used for judging whether or not a battery charge state at the forward travel is in the EV drive area.

Furthermore, the integrated controller 20 prestores mapping data such as that exemplified in FIG. 6 and judges whether or not the battery charge state SOC and a battery output of the input information are in the EV drive area at a certain intervals. When these values are in the EV drive area, the EV mode is selected. When these values are not in the EV drive area, control to not select the EV mode is carried out. Here, the battery output is the product of the target motor/generator torque tTm and the motor/generator revolution speed Nm. The battery output is computed by the integrated controller 20.

With respect to the maps shown in FIGS. 5 and 6, they are used for the forward travel of the hybrid vehicle. On the other hand, in a case of reverse travel of the hybrid vehicle, maps differing from the maps of the FIGS. 5 and 6 and disclosed hereinafter by example are used.

Figure 7:
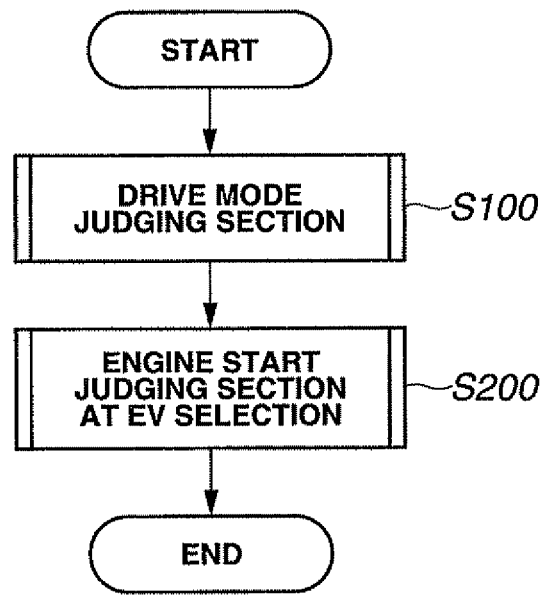
FIG. 7 is a flow chart of a mode change control program at a start of a reverse travel.

When the hybrid vehicle starts reverse travel, a control program shown by a flow chart in FIG. 7 is executed, and the proper drive mode is selected. First, at step S100 a temporary (preliminary or provisional) judgment is made as to whether the hybrid vehicle selects the EV mode or the HEV mode.

Also when a temporary judgment that the EV mode is selected is made, there can arise a case where the engine has to be started. Thus, at next step S200 a final judgment is made as to whether or not the engine 1 is started when the EV mode is selected. Then, the routine is terminated.

Figure 8:
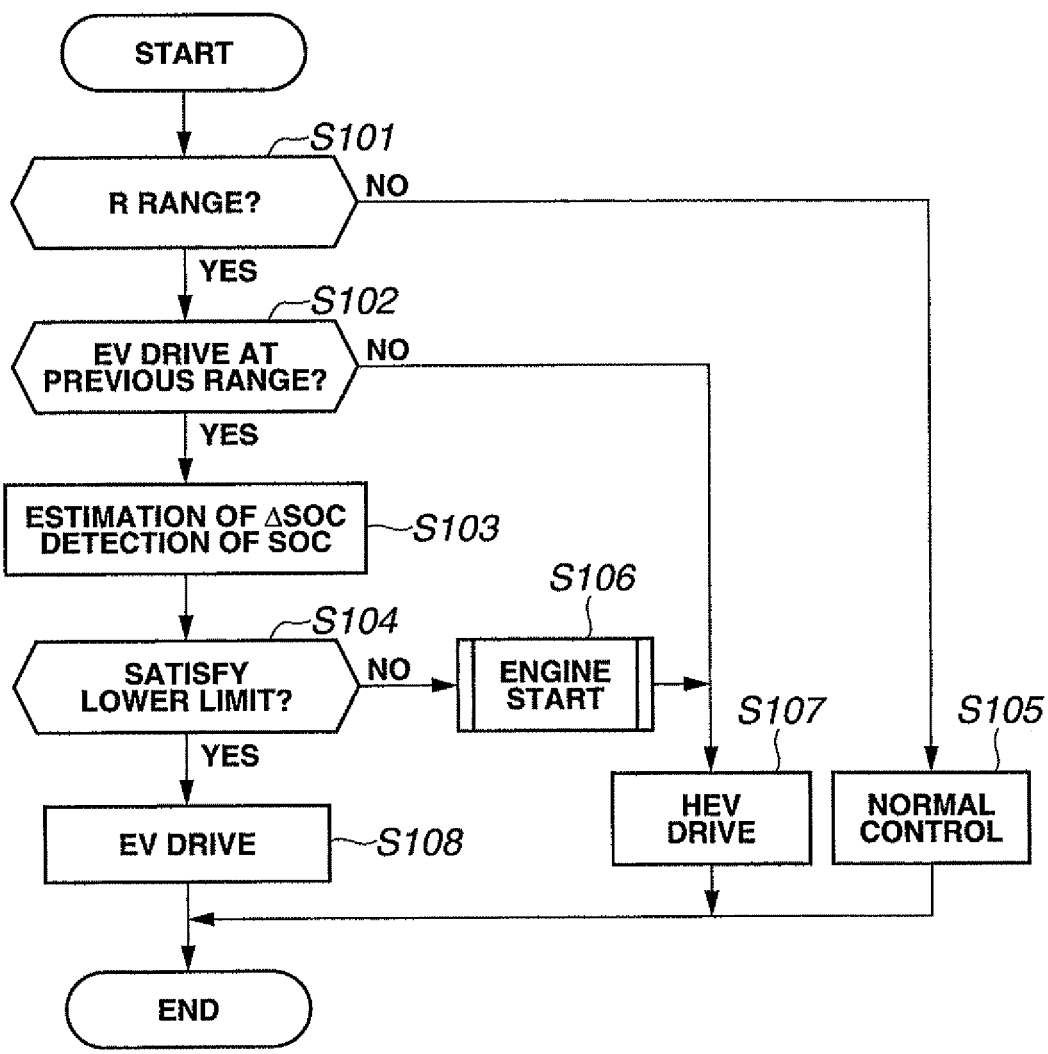
FIG. 8 is a flow chart showing a subroutine of a drive mode judging section shown in the flow chart of FIG. 7.

Returning to step S100, a control program such as that shown by the flow chart in FIG. 8 is executed to judge the drive mode. First, at step S101, a judgment is made as to whether or not the driver shifts or changes a shift lever to a reverse range. In a case where the shift lever is not shifted to the reverse range (namely, NO), the routine proceeds to step S105 since the reverse travel is not started.

At step S105, the drive mode selected for forward travel is selected by normal control based on the maps shown in FIGS. 5 and 6. Then, the routine is terminated.

On the other hand, where the shift lever is shifted to the reverse range (namely, YES) at step S101, since the reverse travel is started the routine proceeds to step S102.

At step S102, a judgment is made as to whether or not the drive mode selected before shifting to the reverse range is the EV mode. In a case where the drive mode before shifting to the reverse range is not the EV mode (namely, NO), that is, the mode is the HEV mode, the routine proceeds to step S107.

At step S107, the HEV mode continues to be selected after shifting to the reverse range. Then, the routine is terminated.

On the other hand, at the above step S102, in a case where the drive mode before shifting to the reverse range is the EV mode (namely, YES), the routine proceeds to step S103.

At step S103, an amount ΔSOC of power of the battery 9 used or consumed for the reverse travel is estimated, and the battery charge state SOC is detected. The integrated controller 20 prestores default values for the estimation. As a rule, the default value is determined as the estimation consumption power amount ΔSOC. A judgment is then made as to whether or not a value obtained by subtracting the default value (ΔSOC) from the detected battery charge state SOC satisfies a lower limit of an allowable range in step S104. Hence, a frequency of the engine start can be reduced.

Here, instead of the above step S103, the following manner of operation is possible. The integrated controller 20 learns an operation history of the accelerator opening APO by the driver and judges target drive characteristics or behavior as to whether an improvement of fuel economy is paramount or a large driving force is paramount. Then the integrated controller 20 executes the determination by calculating the estimation power ΔSOC that meets the judged target drive characteristics. For example, where the improvement of fuel economy is paramount, the estimation power ΔSOC is set to be smaller than the default value. Conversely, where the large driving force is paramount, the estimation power ΔSOC is set to be greater than the default value. Further, the integrated controller 20 might estimate the estimation power ΔSOC more accurately according to a well-known navigation system having geographical information. In this manner, the frequency of the engine start can be further reduced.

At next step S104, by subtracting the power amount ΔSOC from the detected battery charge state SOC of the battery 9, a future battery charge state SOC is calculated as SOC−ΔSOC. Then, a judgment is made as to whether or not this estimation battery charge state SOC−ΔSOC satisfies the lower limit of the allowable range of the battery 9. This lower limit of the allowable range is a value that is the smallest value of the battery charge state SOC within the EV drive area shown in FIG. 6, and an EV drive available power of this lower limit is 0.

Where the estimation battery charge state SOC−ΔSOC satisfies the lower limit of the allowable range (namely, YES), the routine proceeds to step S108.

At step S108, a temporary judgment is made so that the electric drive (EV) mode continues to be selected after shifting to the reverse range. The reason why this judgment is the temporary judgment is because this temporary judgment may be changed at step S200 discussed hereinafter. Then, the routine is terminated.

On the other hand, at step S104, where the estimation battery charge state SOC−ΔSOC is under the lower limit of the allowable range (namely, NO), the routine proceeds to step S106.

At step S106, a judgment is made to start the engine 1. This engine start and an engine start of step S205 described hereinafter are carried out under conditions in which the vehicle speed VSP is 0 and the driver is depressing a brake pedal. At next step S107, the HEV mode is selected. Then, the routine is terminated.

Even if the temporary judgment concludes that the EV mode is selected at step S108, there can occur circumstances where operability improves by the engine start according to driver's desire for the driving force and the vehicle status. Thus, at next step S200, the final judgment is made as to whether the EV mode is selected or the HEV mode is selected.

Figure 9:
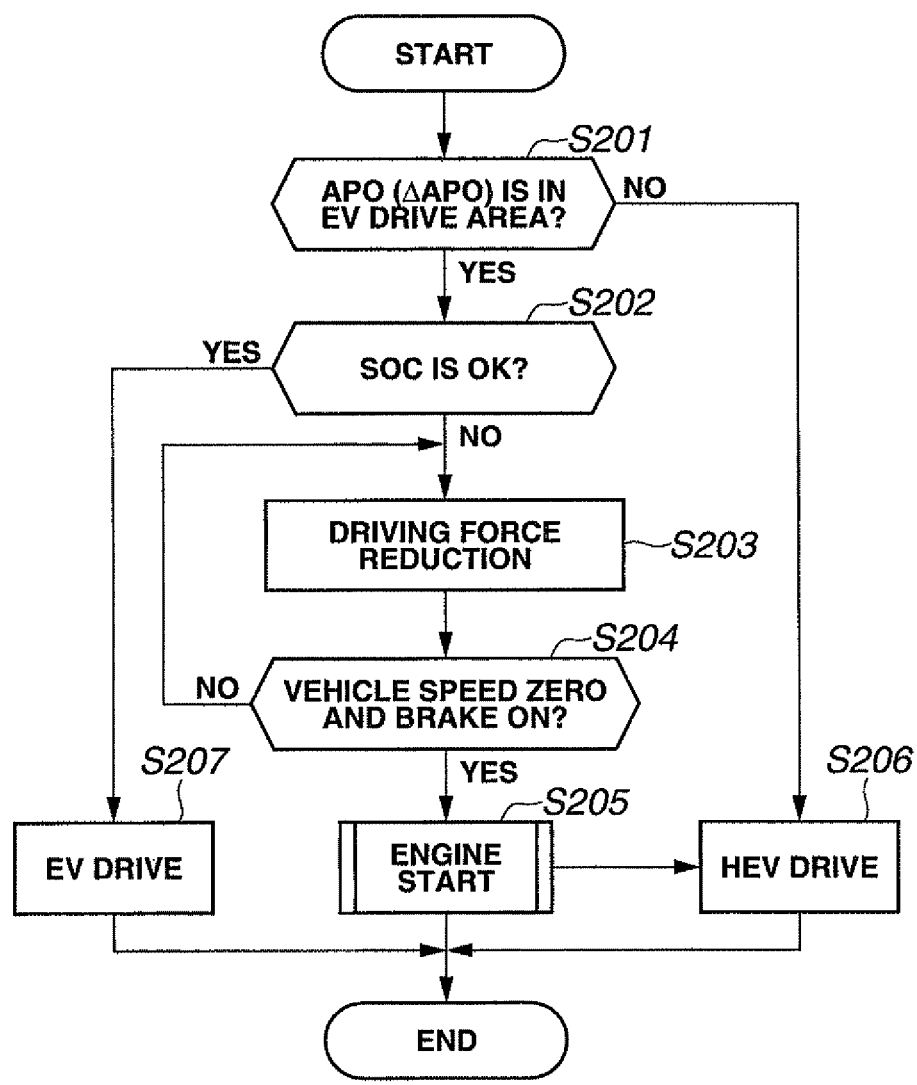
FIG. 9 is a flow chart showing a subroutine of an engine start judging section at EV selection shown in the flow chart of FIG. 7.

This final judgment of the drive mode at step S200 is carried out by a control program shown by a flow chart in FIG. 9.

Figure 10:
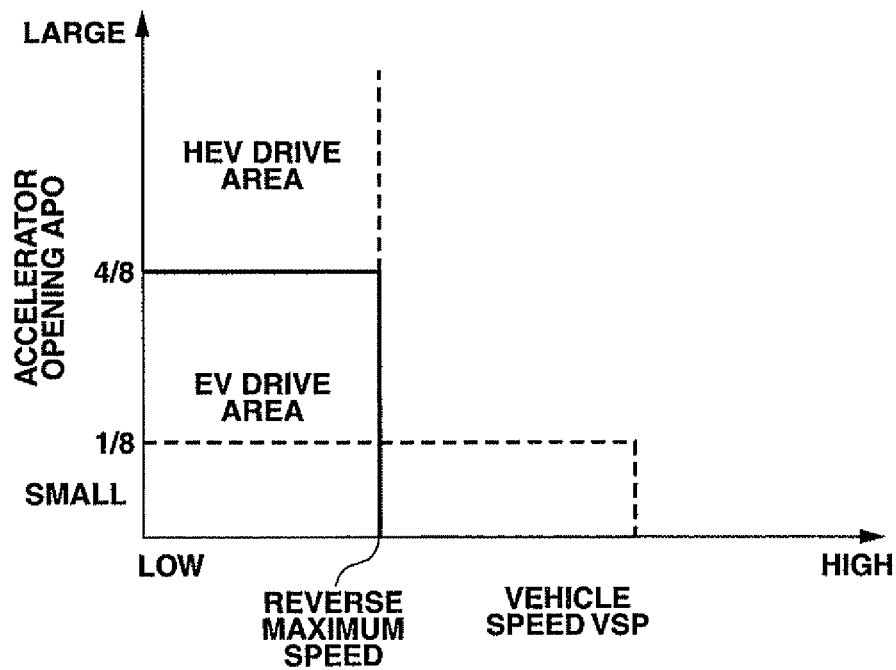
FIG. 10 is an area map showing an EV drive area and a HEV drive area used for selecting a drive mode at the reverse travel.

First, at step S201 of the flow chart in FIG. 9, the accelerator opening APO is detected, and a judgment is made as to whether or not the accelerator opening APO is in the EV drive area by referring to a map such as that shown in FIG. 10. This map of FIG. 10 is a map used for reverse travel. In this map, a dividing line dividing the EV and HEV drive modes is set so that the EV drive area is an area where the vehicle speed VSP is lower than or equal to a reverse maximum speed and the accelerator opening APO is smaller than a predetermined accelerator opening APO. Therefore, in FIG. 10, in a case of a smaller accelerator opening APO than the dividing line shown by a solid line, the EV mode is selected. On the other hand, in a case of an accelerator opening APO that is greater than or equal to this dividing line, the HEV mode is selected. This dividing line differs from the dividing line of the map (FIG. 5) for the forward travel. For comparison purposes, in FIG. 10 the dividing line for the forward travel is shown by a broken line. As shown in FIG. 10, the accelerator opening APO (for instance, 4/8) of the dividing line at the reverse travel is greater than the accelerator opening APO (for instance, 1/8) of the dividing line at the forward travel.

The reason why the EV drive area can be set to be large as described above is next explained. In the case of the reverse travel, a continuous travel distance and/or a frequency of the reverse travel are small as compared with the case of the forward travel. Because of this, an influence on the fuel economy and/or energy management becomes small, so the EV drive area can be set to be large. Accordingly, at the reverse travel the EV drive area is broadened and the EV mode temporarily determined at step S100 can be changed as little as possible. As a result, the frequency of the engine start can be further reduced over what would occur during conditions of forward travel.

Here, in order to prevent hunting, the dividing line used at the mode change from the HEV mode to the EV mode and the dividing line used at the mode change from the EV mode to the HEV mode can be different.

It is preferable to judge whether or not the driver desires the driving force by reading the accelerator opening APO and an accelerator opening change amount ΔAPO and comparing them with predetermined judgment values.

At step S201, in a case where the judgment that the accelerator opening APO (the accelerator opening change amount ΔAPO) is not in the EV drive area and/or the driver desires the driving force (namely, NO), the routine proceed to step S206. There, a final judgment is made so that the hybrid drive (HEV) mode is selected, and the routine is terminated. The reason why this judgment is made is because it is appropriate that the change of the drive mode should override the operability at the reverse travel.

On the other hand, in a case where the judgment that the accelerator opening APO (the accelerator opening change amount ΔAPO) is in the EV drive area and the driver does not desire the driving force (namely, YES at step S201), the routine proceeds to step S202.

The judgment at step S201 is not limited to assessing only the accelerator opening APO and the accelerator opening change amount ΔAPO. A road grade or gradient could be detected according to a depressing force at a brake pedal depression of the driver, the geographical information by the navigation system or an acceleration sensor etc. Then, if the road grade is greater than or equal to a predetermined value, "NO" could be judged at step S201, and if the road grade is smaller than the predetermined value, "YES" could be judged at step S201.

Figure 11:
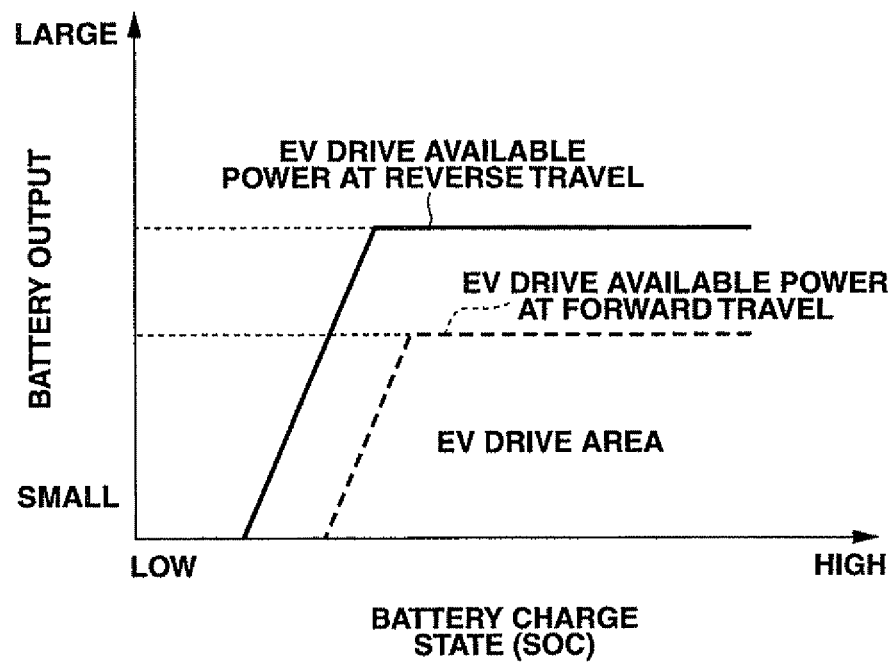
FIG. 11 is an area map used for judging whether or not a battery charge state at the reverse travel is in the EV drive area.

At step S202, a judgment is made as to whether or not the battery charge state SOC and the battery output satisfy a predetermined condition exemplified by a map such as that shown in FIG. 11. FIG. 11 shows an EV drive available power for the battery charge state SOC used for the reverse travel. Between a range of the battery charge state SOC from middle level to high level, reverse travel is possible according to a predetermined EV drive available power. In a range of the low battery charge state SOC, the EV drive available power is gradually reduced as the battery charge state SOC decreases. In a range under a predetermined battery charge state SOC, the EV drive available power becomes 0 (prohibition of the EV drive). The reason for this is that the EV drive available power is limited or restrained with consideration given to fuel economy/energy management.

When the battery output is smaller than the EV drive available power indicated by a solid line in FIG. 11, the vehicle is in the EV drive area of step S202 and satisfies a condition (namely, YES). The routine proceeds to step S207, where the final judgment is made so that the EV mode is selected. Then, the control of FIG. 9 is terminated. Since "YES" was judged at the previous step S201, the driver does not desire a large driving force. Therefore, even if the driver further depresses the accelerator pedal and the accelerator opening APO increases during the reverse travel in the EV mode, the engine start is not carried out. By this manner, engine start shock during the reverse travel can be prevented, and the operability at the reverse travel can be improved.

On the other hand, a battery output that is greater than the EV drive available power does not satisfy the condition of step S202 (namely, NO). Since the EV drive cannot continue to be selected, the routine proceeds to step S203.

Here, the EV drive available power in FIG. 11 associated with step S202 differs from the EV drive available power of the map (FIG. 6) for the forward travel. For comparison purpose, in FIG. 11 the EV drive available power for the forward travel is shown by a broken line. As shown in FIG. 11, the EV drive available power at the reverse travel is set to be greater than the EV drive available power at the forward travel.

The reason why the EV drive area can be large as described above is explained. In this embodiment, as will be described in steps S204 and S205 hereinafter, when the vehicle speed VSP is 0 and the braking operation arises, the engine 1 is started. In other words, during the reverse travel in the EV mode, while the motor/generator 5 provides the driving force to the rear wheels 2, the motor/generator 5 does not start the engine 1. Therefore, motor torque that should be reserved for the engine start as reserve capacity or force can be used as the driving force of the rear wheels 2. As a result, at the reverse travel, the EV drive area is broadened, and the EV mode temporarily determined at step S100 can be changed as little as possible. The frequency of the engine start can be further reduced.

At step S202, the reduction of the SOC is the judging condition, by example. However, besides this SOC reduction, time of overheating of the motor/generator 5 and/or the battery 9 and/or the inverter 10 could be used as the judging condition. When these components 5, 9 and 10 overheat, the routine could proceed to step S203 explained below.

Return to the explanation of FIG. 9, at step S203, the driving force is reduced. The reason for this is that the forward travel is ended to realize the shift change or reverse range at step S101. In addition, this also makes the driver notice the reduction of the driving force.

Since the driver shifting the shift lever to the reverse range will depress the brake pedal, at next step S204, when the brake pedal is depressed and the vehicle speed VSP is 0 (namely, YES), the routine proceeds to step S205, and the engine 1 is started. By this manner, the engine start shock during the travel can be prevented, and the operability at the reverse travel can be improved. On the other hand, at step S204, where the vehicle speed VSP is not 0 or the brake pedal is not depressed (namely, NO), the routine returns to step S203, and the driving force continues to be reduced until the vehicle speed VSP becomes 0 and the brake pedal is depressed.

When the engine start is carried out at the above step S205, the HEV mode is selected at step S206, and the control of FIG. 9 is terminated.

To summarize the control of steps S100 to S200, where the judgment at step S100 is step S105 (the normal control) and step S107 (the HEV mode), the drive mode according to the judgment of steps S105 and S107 is selected. Where the judgment at step S100 is step S108 (the EV mode), this judgment is a temporary judgment, and the routine farther proceeds to step S200. There, the final judgment as to whether to proceed to step S206 (the HEV mode) or to step S207 (the EV mode) is made.

According to this embodiment, the system is configured so that when the shift lever is shifted to the reverse range at step S101 in FIG. 8 (namely, YES), the routine proceeds to step S107 or S108, then the drive mode before the start of the reverse travel is maintained or continued irrespective of the information about the operating condition and driving status shown in FIG. 5. Hence, unlike the conventional case, it is possible to prevent the drive mode from changing during the reverse travel. Thus, control is executed without an accompanying engine start and stop, and the operability is not impaired.

However, there exist cases where it is appropriate that the engine start should override the operability. According to this embodiment, at step S103 in FIG. 8, the battery power amount ΔSOC consumed in the EV mode at the reverse travel is estimated, and the battery charge state SOC at the start of the reverse travel is detected. At next step S104, the estimation battery charge state SOC−ΔSOC obtained by the subtraction of the estimation power amount ΔSOC is calculated. When the estimation battery charge state SOC−ΔSOC is under the lower limit of the allowable range of the battery charge state SOC (namely, NO), the engine 1 is started at the start of the reverse travel at next step S106 even if the drive mode before the start of the reverse travel is the EV mode. The depletion of the battery 9 can be therefore prevented.

Furthermore, as an example of a case where it is appropriate that the engine start should override the operability, at step S201 in FIG. 9, a judgment is made as to whether the EV mode should be selected or the HEV mode should be selected based on information such as the accelerator opening anchor the accelerator opening operating amount at the start of the reverse travel. When the HEV mode is judged (namely, NO), the engine 1 is started at the start of the reverse travel at step S206 even if the drive mode before the start of the reverse travel is the EV mode at step S108. Thus, the driver's desire for driving force can be satisfied.

Here, the EV drive area (FIG. 10) of step S201 is set to be greater than the EV drive area (FIG. 5) for the forward travel in the accelerator opening APO. Hence, unlike the conventional case, it is possible to prevent the drive mode from changing during the reverse travel.

Moreover, as another example of a case where it is appropriate that the engine start should override the operability, at step S202 in FIG. 9, a judgment is made as to whether or not the battery charge state SOC and the battery output are in the EV drive area. When judging that they are not in the EV drive area, even if the drive mode before the start of the reverse travel is the EV mode, the driving force of the rear wheels is gradually reduced to 0 at step S203. Then, when the vehicle speed VSP is 0 and the brake operation is ON at step S204, the engine 1 is started. Consequently, fuel economy and energy management can be taken into consideration properly.

Here, the EV drive area (FIG. 11) of step S202 is set to be greater than the EV drive area (FIG. 6) for the forward travel. As a consequence, unlike the conventional case, it is possible to prevent the drive mode from changing during the reverse travel.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A mode change control system of a hybrid vehicle including an engine and a motor/generator, the control system comprising:
    a controller configured to select one of and change between an electric drive mode in which the hybrid vehicle is driven only by power of the motor/generator with the engine stopped and a hybrid drive mode in which the hybrid vehicle is driven by power of at least the engine, based on information concerning an operating condition and a driving status of the hybrid vehicle; and wherein
    the controller is further configured to maintain one of the electric drive mode and hybrid drive mode that the hybrid vehicle is in before a start of a reverse travel through the start of the reverse travel irrespective of the information concerning an operating condition and a driving status of the hybrid vehicle.

2. The mode change control system according to claim 1 wherein the controller is further configured to:
    select one of the electric drive mode and hybrid drive mode during forward travel based on the information concerning the operating condition and the driving status of the vehicle;
    temporarily maintain the one of the electric drive mode and hybrid drive mode that the hybrid vehicle is in during forward travel during the start of reverse travel so that the one of the electric drive mode and hybrid drive mode at the forward travel is continued at the start of the reverse travel;
    determine which of the electric drive mode and hybrid drive mode the information concerning the operating condition and the driving status of the vehicle at the start of the reverse travel indicates should be selected; and
    during reverse travel, select the hybrid drive mode for the reverse travel even if the electric drive mode was temporarily maintained during the start of reverse travel when the information concerning the operating condition and the driving status at the start of the reverse travel indicates the hybrid drive area, wherein the electric drive area for the reverse travel is greater than the electric drive area for the forward travel.

3. The mode change control system according to claim 2 wherein:
    the information concerning the operating condition and the driving status is an accelerator opening of the hybrid vehicle;
    the electric drive area is an area where the accelerator opening is smaller than a predetermined value; and
    the hybrid drive area is an area where the accelerator opening is greater than or equal to the predetermined value.

4. The mode change control system according to claim 2 wherein the hybrid vehicle further comprises a battery configured to receive power from and to provide power to the motor/generator; and wherein the controller is further configured to:
    estimate a battery power amount to be consumed in the electric drive mode during the reverse travel, wherein the information concerning the operating condition and the driving status is an estimation battery charge state obtained by subtracting the estimation battery power amount from a battery charge state at the start of the reverse travel; and
    during reverse travel, select the hybrid drive mode for the reverse travel even if the electric drive mode was temporarily maintained during the start of reverse travel when the estimation battery charge state is under a lower limit of an allowable range of the battery charge state.

5. The mode change control system according to claim 4 wherein the controller is further configured to obtain the battery charge state of the battery.

6. The mode change control system according to claim 2 wherein the information concerning the operating condition and the driving status includes a usage state of the battery, a usage state of the motor/generator, and a usage state of an electric circuit connecting the motor/generator and the battery; and wherein the controller is further configured to:
    during forward travel, judge whether or not at least one of the usage states at the start of the reverse travel is within an allowable range where the selection of the electric drive mode is allowed;
    detect an operation of a brake by a driver; and
    during reverse travel, gradually reduce a driving force of wheels to zero and select the hybrid mode and start the engine when a vehicle speed is 0 and the brake operation is ON even if the electric drive mode was selected before the start of the reverse travel and temporarily maintained during the start of reverse travel where the at least one usage state at the start of the reverse travel is not within the allowable range.

7. A mode change control system of a hybrid vehicle including an engine and a motor/generator, the control system comprising:
    means for selecting one of and changing between an electric drive mode in which the hybrid vehicle is driven only by power of the motor/generator with the engine stopped and a hybrid drive mode in which the hybrid vehicle is driven by power of at least the engine based on information concerning an operating condition and a driving status of the hybrid vehicle; and
    means for maintaining one of the electric drive mode and the hybrid drive mode in which the hybrid vehicle is operated before a start of a reverse travel through the start of the reverse travel irrespective of the information concerning an operating condition and a driving status of the hybrid vehicle.

8. A method for changing the control system mode of a hybrid vehicle comprising:
    selecting one of and changing between an electric device mode in which the hybrid vehicle is driven by only power of a motor/generator with the engine stopped and a hybrid drive mode in which the hybrid vehicle is driven by power of at least the engine based on information of an operating condition and a driving status of the hybrid vehicle; and maintaining one of the electric drive mode and hybrid drive mode in which the hybrid vehicle is operated before a start of a reverse travel through the start of the reverse travel irrespective of the information concerning an operating condition and a driving status of the hybrid vehicle.

9. The method according to claim 8, further comprising:
selecting one of the electric drive mode and hybrid drive mode during a forward travel based on the information concerning the operating condition and the driving status of the vehicle;
temporarily maintaining the one of the electric drive mode and hybrid drive mode for the reverse travel that was selected for the hybrid vehicle during the forward travel;
determining which of the electric drive mode and hybrid drive mode the information concerning the operating condition and the driving status of the vehicle at the start of the reverse travel indicates should be selected; and
during reverse travel, selecting the hybrid drive mode for the reverse travel even if the electric drive mode was temporarily maintained during the start of reverse travel where the information concerning the operating condition and the driving status at the start of the reverse travel indicates the hybrid drive area, wherein the electric drive area for the reverse travel is greater than the electric drive area for the forward travel.

10. The method according to claim 9 wherein the hybrid vehicle further comprises a battery configured to receive power from and to provide power to the motor/generator, the method further comprising:
estimating a battery power amount to be consumed in the electric drive mode during the reverse travel, wherein the information concerning the operating condition and the driving status is an estimation battery charge state obtained by subtracting the estimation battery power amount from a battery charge state at the start of the reverse travel; and
during reverse travel, select the hybrid drive mode for the reverse travel even if the electric drive mode was temporarily maintained during the start of reverse travel when the estimation battery charge state is under a lower limit of an allowable range of the battery charge state.

11. The method according to claim 10, further comprising:
estimating the battery charge state of the battery.

12. The method according to claim 9 wherein the information concerning the operating condition and the driving status includes a usage state of the battery, a usage state of the motor/generator, and a usage state of an electric circuit connecting the motor/generator and the battery, the method further comprising:
during forward travel, judging whether or not at least one of the usage states at the start of the reverse travel is within an allowable range where the selection of the electric drive mode is allowed;
detecting an operation of a brake by a driver; and
during reverse travel, gradually reducing a driving force of wheels to zero, select the hybrid mode and starting the engine when a vehicle speed is 0 and the brake operation is ON even if the electric drive mode was selected before the start of the reverse travel and temporarily maintained during the start of reverse travel where the at least one usage state at the start of the reverse travel is not within the allowable range.

13. The method according to claim 8, further comprising:
judging whether or not a usage state at the forward travel is within an allowable range where the selection of the electric drive mode is allowed; and wherein the allowable range used for the reverse travel is greater than the allowable range used for the forward travel.

* * * * *